US011914405B2

(12) United States Patent
Kim

(10) Patent No.: US 11,914,405 B2
(45) Date of Patent: Feb. 27, 2024

(54) FLOW RATE REGULATOR

(71) Applicant: Neoperl GmbH, Herzogenaurach (DE)

(72) Inventor: Seoung-Eun Kim, Bad Krozingen (DE)

(73) Assignee: NEOPERL GMBH, Mullheim (DE)

(*) Notice: Subject to any disclaimer, the term of this patent is extended or adjusted under 35 U.S.C. 154(b) by 700 days.

(21) Appl. No.: 17/045,226

(22) PCT Filed: Mar. 6, 2019

(86) PCT No.: PCT/EP2019/055611
§ 371 (c)(1),
(2) Date: Oct. 5, 2020

(87) PCT Pub. No.: WO2019/206503
PCT Pub. Date: Oct. 31, 2019

(65) Prior Publication Data
US 2021/0165427 A1 Jun. 3, 2021

(30) Foreign Application Priority Data
Apr. 27, 2018 (DE) .......................... 202018102383.7

(51) Int. Cl.
F16L 55/027 (2006.01)
G05D 7/01 (2006.01)

(52) U.S. Cl.
CPC ........... *G05D 7/0113* (2013.01); *G05D 7/012* (2013.01); *F16L 55/027* (2013.01)

(58) Field of Classification Search
CPC . F16L 55/027; G05D 7/012; Y10T 137/7771; Y10T 137/7869; Y10T 137/789

USPC ...... 138/43, 45, 46; 137/493, 605, 504, 517, 137/854; 239/533.13, 533.14; 251/120
See application file for complete search history.

(56) References Cited

U.S. PATENT DOCUMENTS

| | | | | |
|---|---|---|---|---|
| 2,948,296 A | * | 8/1960 | Thorburn | G05D 7/012 251/207 |
| 3,409,050 A | * | 11/1968 | Weese | F16K 47/10 138/45 |
| 4,196,753 A | | 4/1980 | Hammarstedt | |
| 4,344,459 A | * | 8/1982 | Nelson | G05D 7/012 138/41 |
| 4,883,093 A | * | 11/1989 | Miles | G05D 7/012 239/533.14 |

(Continued)

FOREIGN PATENT DOCUMENTS

| | | |
|---|---|---|
| DE | 2729458 | 1/1979 |
| DE | 10311501 | 10/2004 |

(Continued)

*Primary Examiner* — Patrick F Brinson
(74) *Attorney, Agent, or Firm* — Volpe Koenig

(57) ABSTRACT

A flow rate regulator (1) for limiting a flow rate of a fluid, in which a clear opening dimension (5), which can be modified between a maximum and a minimum, of a control opening (3), may be defined by an interaction between a control element (2) and a housing (4) of the flow rate regulator (1). The clear opening dimension (5) of the control opening (3) can be modified by a deformation of the control element (2) as a function of a pressure acting on the control element (2). The control element (2) has at least two segments (6) which are detached from one another and can each be deformed as a function of pressure, and an edge (7) defining the control opening (3) is formed by the control element (2) and the housing (4).

24 Claims, 5 Drawing Sheets

(56) References Cited

U.S. PATENT DOCUMENTS

| | | | |
|---|---|---|---|
| 4,884,750 A | 12/1989 | Werding | |
| 4,976,283 A | 12/1990 | Wildfang et al. | |
| 5,469,883 A * | 11/1995 | Lee | F16K 15/148 |
| | | | 137/854 |
| 7,222,643 B2 * | 5/2007 | Bailey | G05D 7/0106 |
| | | | 138/44 |
| 7,392,828 B2 | 7/2008 | Hart et al. | |
| 7,753,070 B2 | 7/2010 | Hart | |
| 9,777,857 B2 * | 10/2017 | Chen | F16K 15/148 |
| 10,017,924 B2 | 7/2018 | Zoller et al. | |

FOREIGN PATENT DOCUMENTS

| | | |
|---|---|---|
| DE | 10311502 | 10/2004 |
| DE | 102007010618 | 11/2008 |
| DE | 102014006215 | 11/2015 |
| EP | 0350721 | 1/1990 |
| EP | 3115661 | 1/2017 |
| WO | 2009062997 | 5/2009 |
| WO | 2012036627 | 3/2012 |

\* cited by examiner

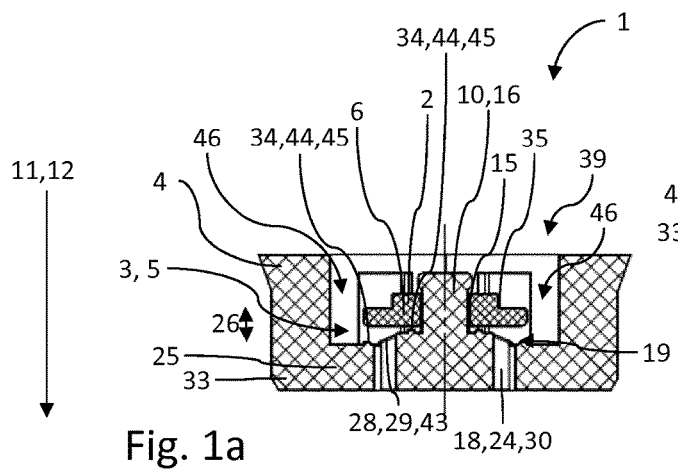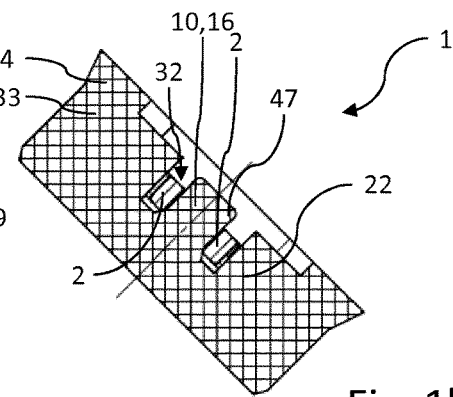
Fig. 1a
Fig. 1b
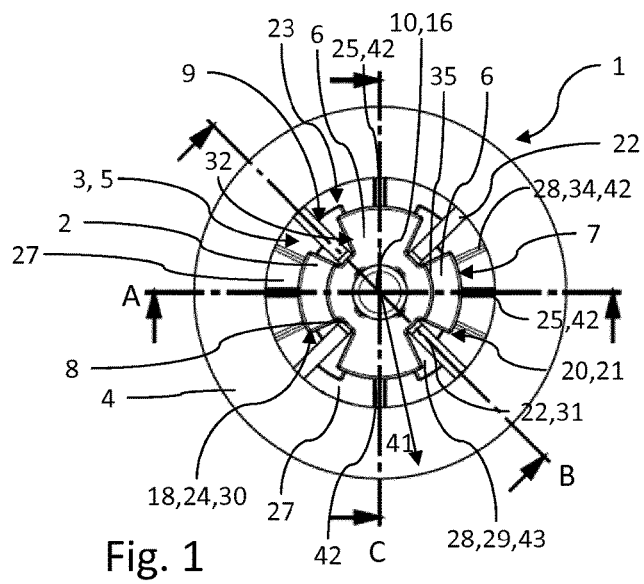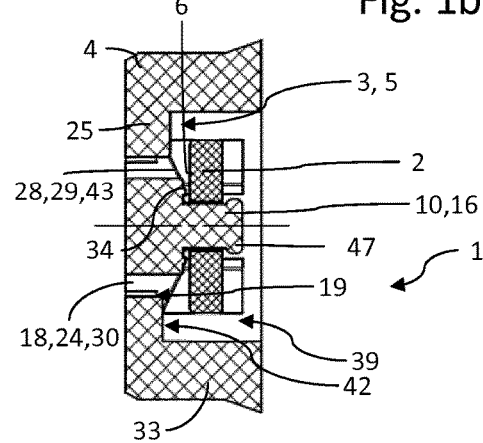
Fig. 1
Fig. 1c
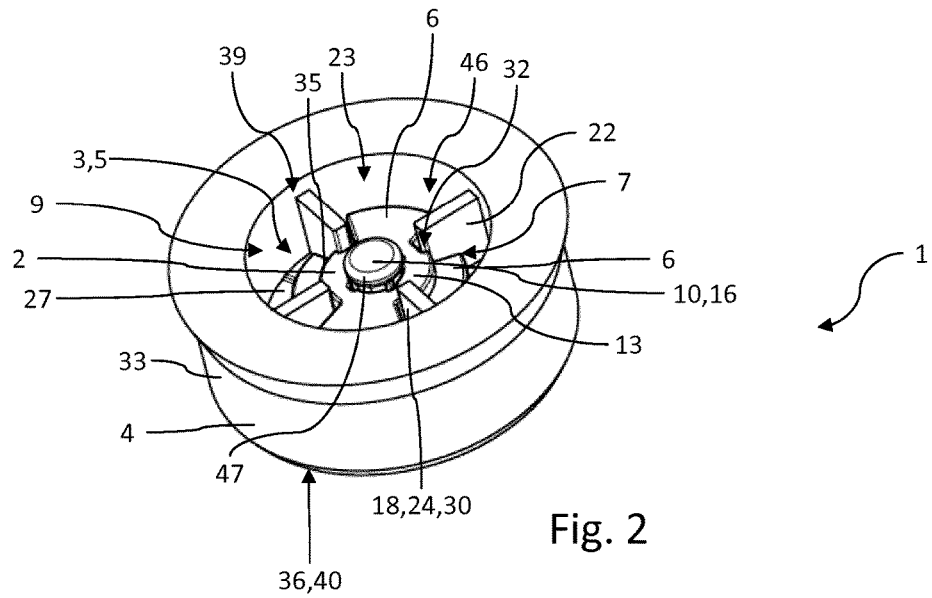
Fig. 2

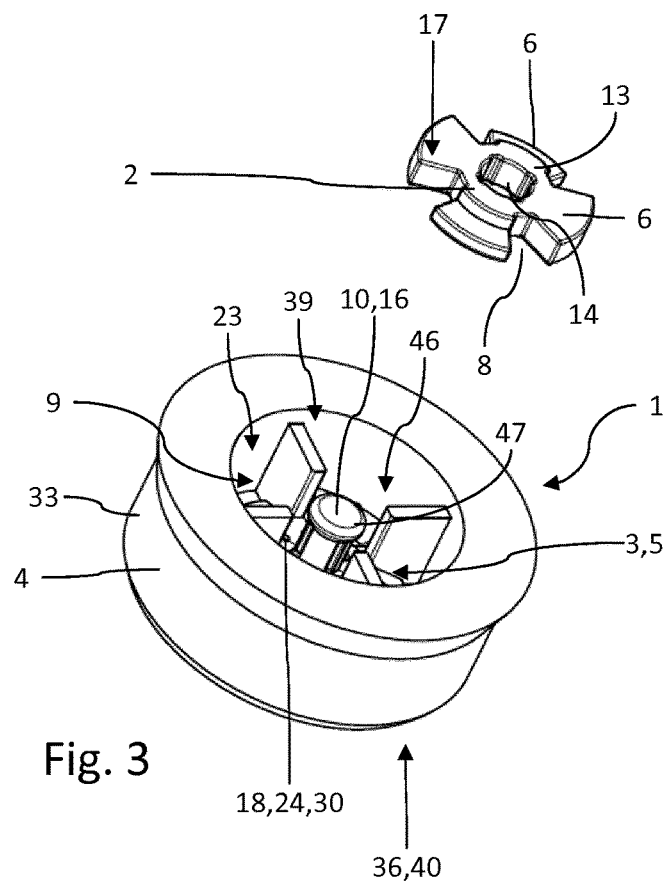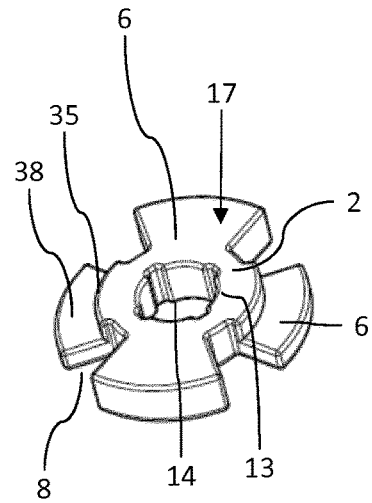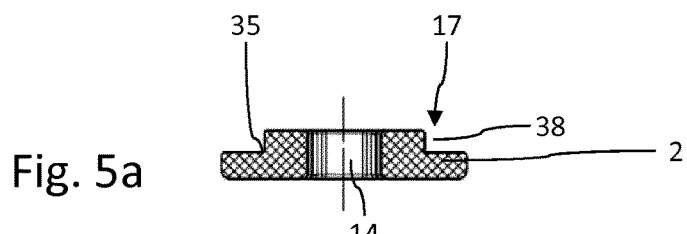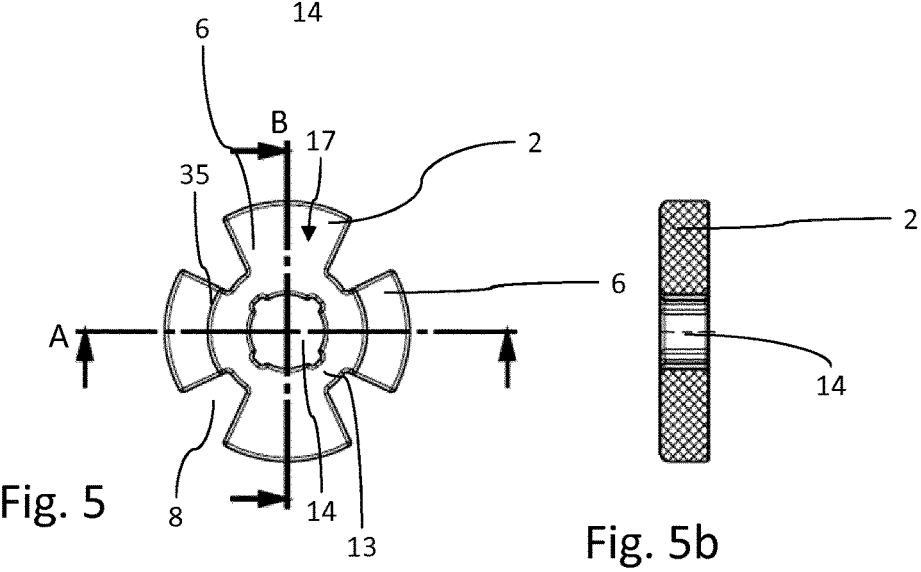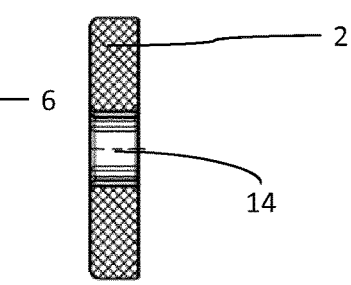

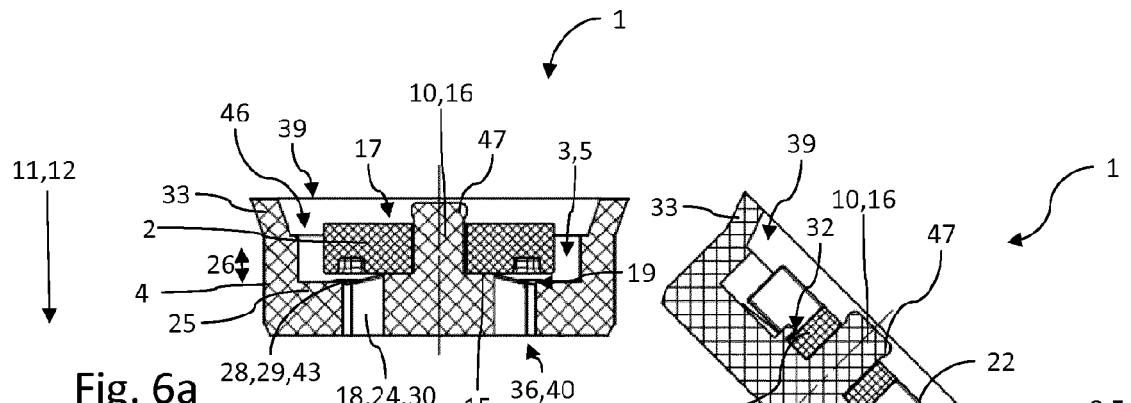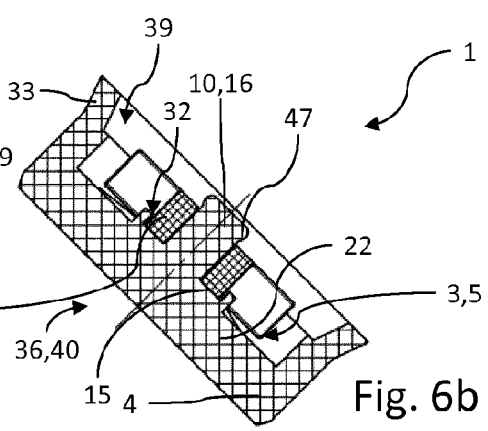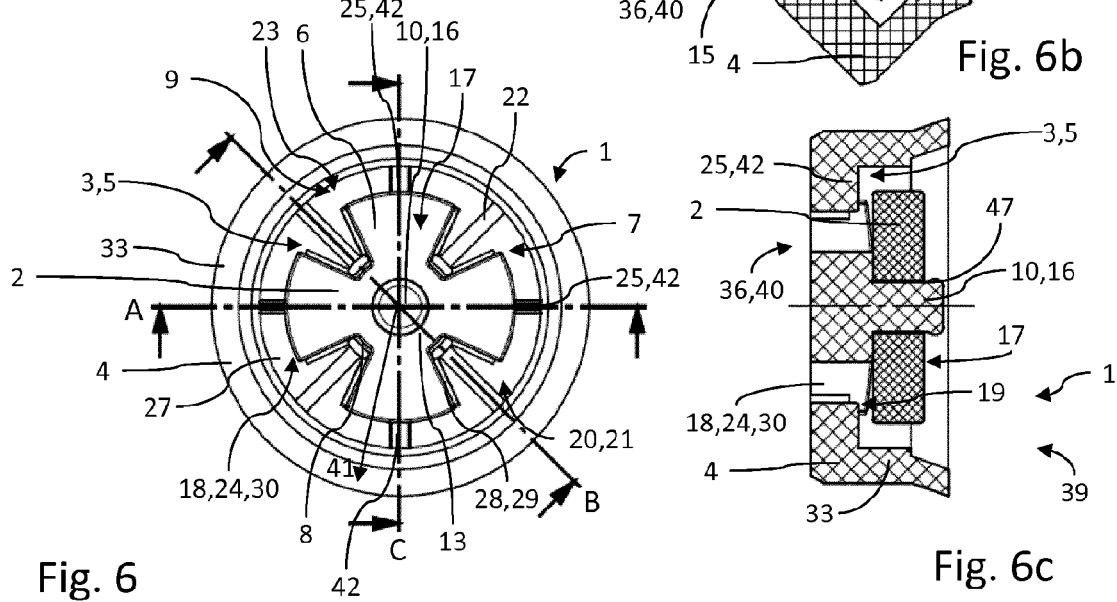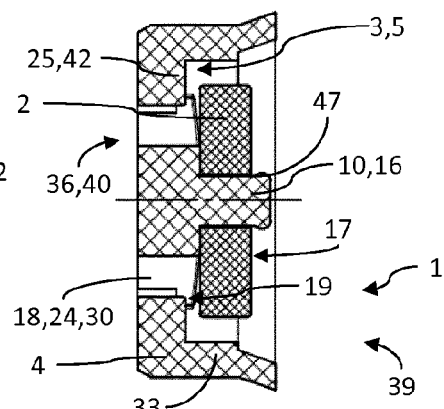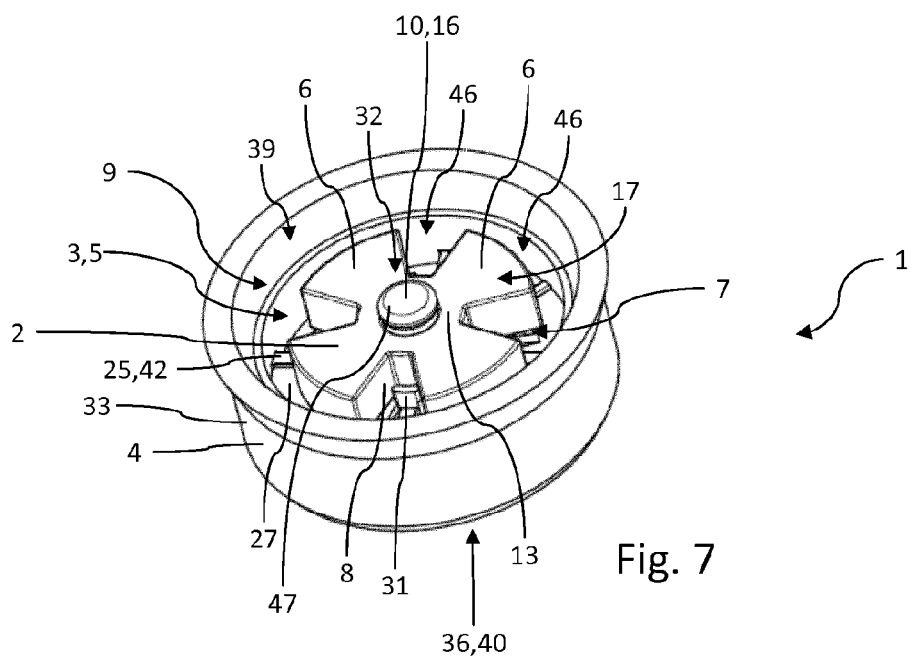

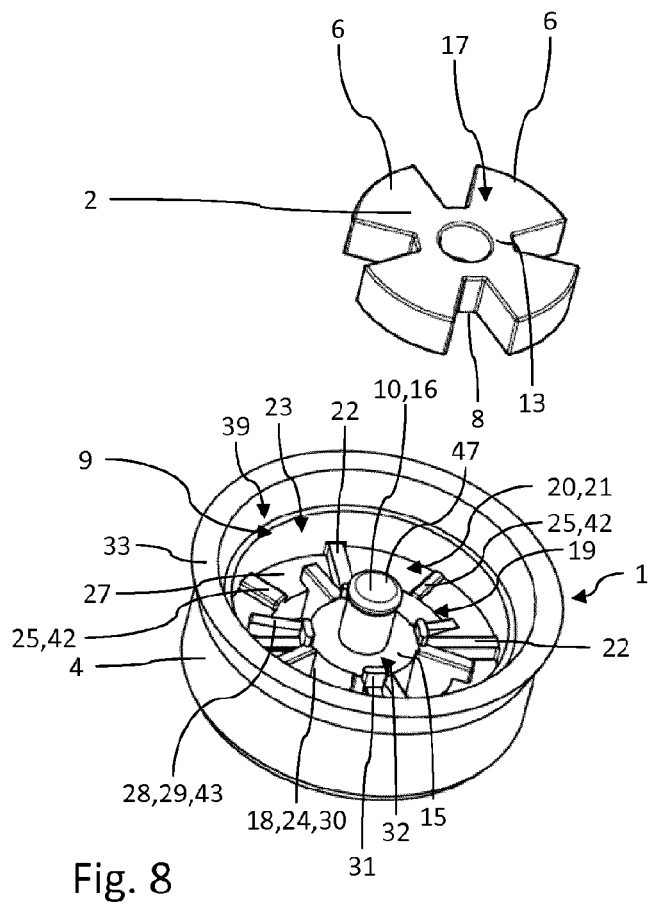
Fig. 8
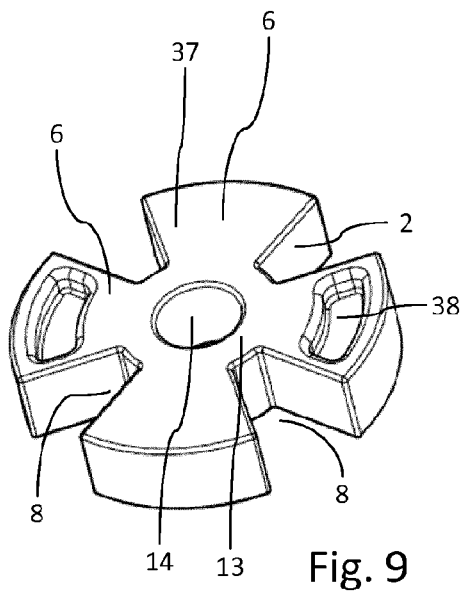
Fig. 9
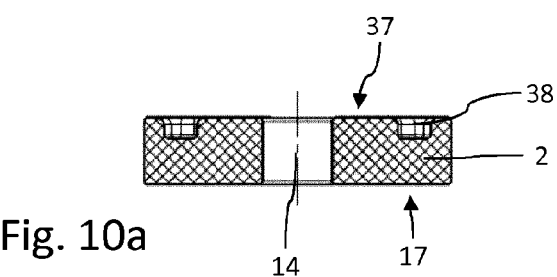
Fig. 10a
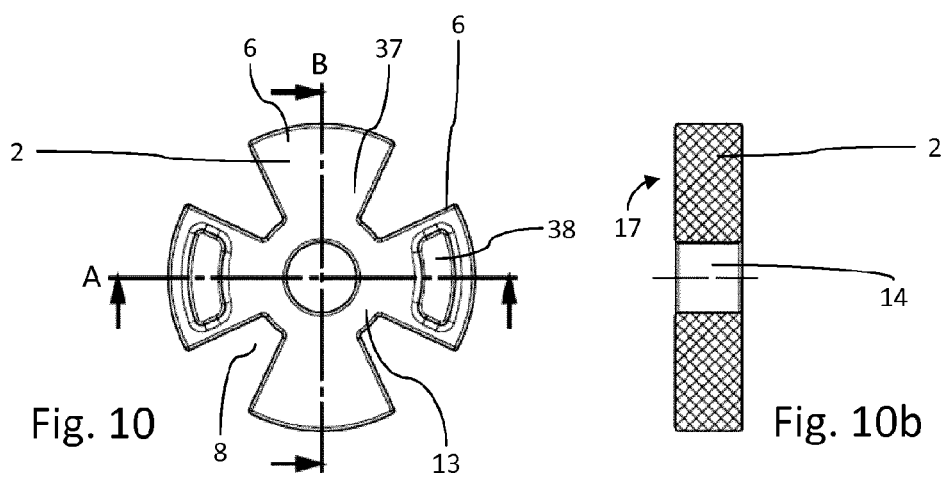
Fig. 10
Fig. 10b

FLOW RATE REGULATOR

TECHNICAL FIELD

The invention relates to a flow rate regulator for adjusting the flow rate of a fluid, in particular a liquid or gaseous medium, the flow rate regulator having a control element and a control opening which is formed at least partially by a housing, wherein the clear opening dimension of the control opening can be varied by the control element as a function of the pressure acting on the control element. Preferably, the flow rate regulator is designed to be inserted into an outlet of sanitary outlet valve, a heating boiler and/or a household appliance, for example a coffee machine.

The invention thus further relates to the use of a flow rate regulator of the aforementioned type in a sanitary outlet valve, a heating boiler and/or a household appliance for setting a certain flow rate per unit of time, in particular a near constant flow rate within a working range.

Finally, the invention relates to a sanitary outlet valve, a heating boiler and/or a household appliance with a flow rate regulator for setting a specific flow rate of a liquid medium per unit time.

BACKGROUND

Flow rate regulators of the aforementioned type are generally used to provide a flow rate of a fluid, in particular a liquid, such as in particular water, or a gas, per unit of time, that is independent of the pressure within the respective line to the greatest extent possible. In contrast to so-called restrictors that commonly comprise a simple, constant narrowing of a line cross-section, and thus generate local flow resistance, flow rate regulators have a control element that can modify its flow resistance depending on the pressure in order to create a flow rate that is independent of pressure.

However, flow rate regulators that are currently known have the disadvantage that the degree of flow rate control they can achieve is not sufficiently accurate, for example to avoid fluctuations in flow rates at varying pressures or to be able to set a specific flow rate per unit of time on a nearly constantly basis over a wider pressure range.

SUMMARY

Accordingly, the objective is to create a flow rate regulator of the aforementioned type by means which it is possible to improve control over the flow rate of a fluid, especially a liquid and/or gaseous medium.

This objective is achieved according to the invention by using one or more features disclosed herein. Without limitation, the proposed solution to the objective according to the invention is that the control element comprises at least two segments, detached from each other, that are deformable depending on pressure and that the control element comprises a section of the edge of the control opening. As a result, the pressure-dependent deformation of the segments is possible for purposes of the pressure-independent adjustment of the flow rate per time unit within at least one functional area. The term "detached" may refer to the circumstance that the segments are independently deformable and/or movable. The term "control opening" may refer to an opening in the flow path of the flow rate regulator the edge of which can be formed by a component or different components of the flow rate regulator. Preferably, the edge area of the control opening is formed by the housing and the control element. In particular, the clear opening dimension of the control opening can determine a quantity of fluid flowing per time unit.

Optional, advantageous features of the invention are described below. The features of these embodiments may be combined with the aforementioned features either alone or in combination with the features of other embodiments.

In order to achieve particularly effective detachment of the segments, the at least two segments may be detached by means of a notch formed between them. Such a notch can separate the segments in the area of the notch. In the case of disk-shaped control elements in particular, the notch may run from the outer edge of the control element inward.

A disk-shaped control element is preferred. This makes it particularly easy to detach segments by means of a notch.

The segments may be continuously deformable in order to achieve particularly precise control of the flow rate per time unit. Such is continuous deformation is possible dependent upon pressure exerted on the segments. In particular, the segments can continuously deform and/or move continuously under changing pressure. It is thus possible for the segments likewise to occupy pressure-dependent interim positions, for example in a state of equilibrium, between maximum opening and a very small control opening in a stable fashion. This can have the advantage that a flow rate of fluid passing through per time unit may be limited, at least in one functional area, to a constant or at least nearly constant value, independent of pressure.

The clear opening dimension of the control opening may be defined by interaction between the control element and the housing. The narrowest point of a flow channel leading through the flow rate regulator may be viewed as the control opening. In particular, the term edge of the control opening may refer to a one-dimensional structure. In particular, the term control opening can refer to a two-dimensional structure.

The control opening can have a non-circular and/or asymmetrical shape, which is defined, for example, by the pressure-dependent interaction between the housing and the control element.

It is therefore possible for the control opening to be formed, not by a component of the flow rate regulator, but at least by the housing and the control element. It may also be provided that multiple, separate control openings may, especially pressure-dependent, be formed as a result of the interaction between the housing and control element.

In one flow rate regulator embodiment, a mounting device may be located in a receiving chamber to which the control element may be placed and/or mounted within the housing. Preferably, the control element will be mounted by means of the fastener in such a way that the control element is deformably mounted at least parallel to a longitudinal axis of the flow rate regulator. Alternatively or additionally it may be provided for the control element to be mounted by means of the fastener in such a way that the control element is deformably mounted on the housing at least parallel to a direction of flow of a fluid flowing through the flow rate regulator when in operation. Accordingly, the fastener makes it possible, at least in part, to define at least one degree of freedom for movement and/or deformation of the control element. This embodiment is particularly suitable for disc-shaped control elements.

In a further embodiment, the control element may have a connector to which the individual segments are connected. Alternatively or additionally the control element may have a connector, for example the aforementioned connector, by means of which the control element is mounted within the housing. Preferably, the connector may have a mounting opening, in particular a continuous one, into which a fastener may be inserted. A further preferred type fastener may be a pin projecting from the floor of the mounting space. This enables even better detachment of the segments from each other.

In order to be able to deform individual segments differently at a specific pressure, in particular to be able to form different flow resistances through the segments, the at least two segments can have different resistances to pressure-dependent deformation, i.e. deformation resistances. In particular, this can be done in such a way that the at least two segments are set up to adjust a flow rate in different pressure ranges. For example, the at least two segments may differ in their material thickness and/or in their stiffness and/or in their shape and/or in the size of a contact surface and/or in their material.

Unlike arrangements in which a control element either completely closes or completely opens a flow opening, the flow controller, as described and claimed herein, may be designed to limit and/or not completely close the clear opening of the control opening. Accordingly, in one embodiment, the edge of at least one housing control opening may comprise at least part of the edge defining the control opening. For example, the outlet opening can be arranged downstream of the control element in the direction of flow.

In the case of one embodiment of the flow rate regulator, one, or the aforementioned, housing outlet opening, which is preferably arranged downstream of the control element, may be designed preferably as an annular gap or as a plurality of interrupted gap sections that are preferably arranged in annular fashion. In particular, the gap or the gap sections may be designed as a circumferential and/or annular gap or gap section in one circumferential direction. The gap or the gap sections may extend around one or the aforementioned fastener. For example, the gap or gap sections may extend around the fastener arranged centrally in the housing.

In the case of one embodiment of the invention, it may be provided that a partition is located between the two segments. A benefit in this context is that the segments may be especially easily detached. A partition can additionally prevent the occurrence of cross flow by means of which the control response of one segment is influenced by the control response of the adjacent segment.

Preferably, the partition separates one, for example the aforementioned, outlet opening of the housing in a way that corresponds to the partition of the control element. The outlet opening may thus be subdivided to correspond with the control element. This enables the prevention of flow from one segment into part of the outlet opening that is not associated with the respective segment. A particularly advantageous embodiment is where the partition engages with the control element, for example in the notch, or even fits over it, for example over the notch, and/or if the partition protrudes from the control element on the inflow side. This permits the creation of a laterally enclosed receiving chamber.

In order to be able to achieve separation of the parts of the receiving chamber in which the individual segments are arranged, the flow rate regulator may comprise at least two partitions, which divide one, or the aforementioned, receiving chamber arranged in the flow direction in front of one, or the aforementioned, housing outlet opening in which the control element is arranged within the housing into at least two segregated segment chambers in which segment chambers at least one segment each is arranged. Alternatively or in addition, it may be provided that the partitions divide one or the outlet opening of the housing into at least two separate outlet opening sections. The partitions may be used to segregate the segment chambers and/or the individual segments and/or the outlet opening sections from each other so that, for example, the influence of a deflected flow within a segment chamber cannot have any disruptive effect on an adjacent segment chamber. In this context, the partitions may be arranged parallel to the flow direction. As a result, the flow may be guided particularly efficiently from the segment into the (subordinate if applicable) outlet opening. However, the partitions walls may also be aligned at an angle within the attachment element.

The formation of at least two partitions makes it possible to enclose at least one segment within partitions on both sides. This permits the creation of a receiving chamber that is assigned to at least one segment. Preferably, all of the partitions are arranged in an assigned notch in the control element, preferably between adjacent segments.

In order to be able to define a minimum of the clear opening dimension of the control opening and/or stronger resistance on the part of the control element to further deformation, at least one spacer can be arranged in at least one segment chamber, which can be acted upon in a pressure-dependent manner by the at least one segment arranged in such segment chamber. The spacer may thus subdivide the respective segment at higher pressures to which the control element is exposed, so as to provide greater resistance to further deformation. This permits the definition of low pressure behavior and high pressure behavior of the segment. Preferably, the at least one spacer may be arranged offset in the radial direction to one, or the, outlet opening or one, or the, outlet opening section. In particular, the spacer may be designed in such a way that, in its operational position, the spacer defines a distance between the segment acting on the spacer and an impact surface of the segment chamber.

In order to be able to define a minimum for the clear opening dimension of the control opening, at least one contact body can alternatively or additionally be arranged in at least one segment chamber, which contact body has a contact surface oriented obliquely relative to a, for example the aforementioned longitudinal axis and/or to a, for example the aforementioned radial direction, which can be acted upon by a segment arranged in the segment chamber In particular, the flow rate regulator may be arranged in such a way that the contact surface is acted upon by the segment when the segment is deformed as a function of pressure, preferably with a seal being able to be produced or being produced between the segment and the contact body in the functional area of the contact surface with the segment.

In one flow rate regulator embodiment, for example the aforementioned, outlet opening sections of at least one segmental chamber can be divided into two separate partial openings by means of a, for example the aforementioned, contact element. Accordingly, the flow of the fluid can be controlled even better by splitting a jet into individual jets, each of which exits the flow rate regulator on the outlet side.

In order to achieve particularly precise control of the flow rate per time unit, the control element can have at least four segments which are detached from each other and can each be deformed depending on the pressure. It may be particularly useful if two opposing segments are designed as pairs of segments with the same embodiment and/or that the pairs of segments within the control element are each designed to adjust the flow rate within different pressure ranges. In particular, pressure ranges may refer to a high pressure range and a low pressure range, preferably within one functional range.

In order to slow down the flow velocity of the fluid within the flow rate regulator more efficiently, the segment chambers can each have an impact surface arranged diagonally and/or perpendicular to the longitudinal axis of the flow rate regulator. The impact surfaces of the at least two segment chambers can be arranged offset and/or tiered in relation to each other in the longitudinal direction. Different control properties for the segment chambers may thus be implemented.

In order to be able to define at least one degree of freedom for the control element, it may be the case that the flow rate regulator comprises a plurality of support elements each of which includes a groove into which the control element is inserted. The support elements may be arranged in a notch in the control element between two segments. The support elements may alternatively or additionally be placed on one or more of the aforementioned mounting space floors and/or on the partitions, or each may be designed as a partition, for example the aforementioned partition. The groove can be open in a direction opposite the flow direction. This makes the control element particularly easy to insert and prevents it from being displaced and/or deformed in an undesired direction when pressure is applied. For example, the retaining elements can be formed on or through the partitions.

It is particularly advantageous if the at least two segments are integrally connected. This means that an integral control element can be used which, for example, can be manufactured from a homogeneous material, and in particular may be punched. It can be particularly advantageous for the control element to be monolithic.

A multi-part control element may be used according to another advantageous embodiment, whereby the segments of the control element are formed by an upper part and a lower part. Accordingly, this enables different deformation resistances of the segments to be achieved simply.

According to another, particularly cost-effective embodiment, the control element may have an upper part, for example the upper part mentioned above, and a lower part, for example the lower part mentioned above, wherein the upper and lower parts are of identical design. This has the advantage that only one manufacturing tool is required to produce the control element, wherein different deformation resistances of the segments may still be created due to the identically shaped parts.

The housing may have a circumferential wall that limits one, for example the aforementioned, receiving chamber and/or the segment chambers in the radial direction outward in order to better prevent unintentional leakage due to fluid escaping at a point not intended for this purpose.

A flow rate regulator can alternatively be designed without a wall in order to achieve the smallest possible outside diameter; in this case a receiving tube can perform the function of the wall.

A spacing element may be arranged or affixed to the upper side of the spacer and/or the upper side of the support element in order to be able to set the opening dimension of the control opening of the flow rate regulator with greater precision and/or in order be able to set a specific flow rate per time unit within a functional rate with greater precision. In particular, the spacing element can be designed so as to be able to prevent contact between the control element and the receiving chamber floor and/or the upper side of the spacing element and/or the support element along the entire surface and/or in its entirety. For example, the spacing element can be designed to comprise at least one pin and/or at least one ridge. Such a spacing element may also be designed and arranged to create a defined support and/or bending point for the control element. This accordingly permits the creation of the desired deformation behavior, in particular in the low-pressure range.

The control element may be made of an elastic and/or compressible material in order to better achieve continuous deformation of the control element. It may be particularly advantageous for the control element to be made of a continuously, pressure-dependent deformable material, such as an elastomer.

It may be advantageous for the at least two segments, or pairs of segments, to be of different design for improved control of a flow rate within different pressure ranges. It may, for example, be provided that at least one segment has a tiered surface, in particular in such a way that the segment has a tiered contact surface on an inlet side. This may even represent a weakening of the material. In this context, it is advantageous that the tiered segment may be further deformable at a lower pressure than a non-tiered segment without; it may therefore have a greater and/or uniform material thickness.

Alternatively or additionally, it may be provided that a material weakening is to be created such that at least one segment has a material recess. Preferably, a pair of segments comprising two opposing segments may have at least one recess in each segment. The recess may be formed on a bottom side facing an outlet side of the flow rate regulator in order to prevent fluid from collecting in the recess.

A particularly robust and easy-to-manufacture design of the flow rate regulator may provide for the housing to be of integrated and/or monolithic design. This has the advantage that the flow rate regulator can be manufactured using relatively few parts. In particular, the partitions and/or the fasteners and/or the spacers and/or the installation bodies and/or the support elements may be formed by the housing. Preferably, the housing can be manufactured by means of injection molding which permits particularly cost-effective production. This permits the creation of a two-part flow rate regulator comprising housing and the control element.

The flow rate regulator can be designed in such a way that the control element is arranged in a flow path between an inlet and an outlet of the flow rate regulator.

BRIEF DESCRIPTION OF THE DRAWINGS

This invention will now be described on the basis of several exemplary embodiments; however, the invention is not limited to these exemplary embodiments. Additional example embodiments may result from the combination of the features described herein with each other and/or with one or more features from the example embodiments.

In the figures:

FIG. 1 shows a first exemplary embodiment of a flow rate regulator for setting a flow rate, with a control element having four detached segments, wherein two opposing segments of the same embodiment form a pair of segments each, shown in a simplified schematic top view;

FIG. 1A provides a representation of the longitudinal section of the flow rate regulator shown in FIG. 1 indicated by the line marked with the letter A, wherein the longitudinal section passes through two opposing spacers;

FIG. 1B provides a representation of the longitudinal section of the flow rate regulator in FIG. 1 indicated by the line marked with the letter B, wherein the longitudinal section passes through two opposing partitions;

FIG. 1C provides a representation of the longitudinal section of the flow rate regulator in FIG. 1 indicated by the line marked with the letter C, wherein the longitudinal section passes through two opposing spacers;

FIG. 2 shows a perspective view of the embodiment of the flow rate regulator shown in FIGS. 1 and 1A-C;

FIG. 3 shows a perspective, simplified exploded view of the embodiment of the flow rate regulator shown in FIGS. 1, 1A-C and 2, wherein a pair of segments comprises tiered segments that have a material recess on their upper side;

FIG. 4 shows a perspective representation of the control element of the flow rate regulator from the preceding Figures comprising two pairs of segments each consisting of identically shaped segments, wherein the segments of one pair of the two pairs of segments have a material recess;

FIG. 5 shows a top view of the control element of the flow rate regulator from the preceding Figures;

FIG. 5A shows a sectional view of the control element from FIG. 5, wherein the control element is cut-out along the line marked with the letter A in FIG. 5;

FIG. 5B shows a sectional view of the control element from FIG. 5, wherein the control element is cut-out along the line marked with the letter B in FIG. 5;

FIG. 6 shows a second exemplary embodiment of a flow rate regulator for setting a flow rate, with a control element having four detached segments, wherein two opposing segments of the same embodiment form a pair of segments each, shown in a simplified schematic top view;

FIG. 6A provides a representation of the longitudinal section of the flow rate regulator shown in FIG. 6 indicated by the line marked with the letter A, wherein the longitudinal section passes through two opposing spacers;

FIG. 6B provides a representation of the longitudinal section of the flow rate regulator in FIG. 6 indicated by the line marked with the letter B, wherein the longitudinal section passes through two opposing partitions;

FIG. 6C provides a representation of the longitudinal section of the flow rate regulator in FIG. 6 indicated by the line marked with the letter C, wherein the longitudinal section passes through two opposing spacers;

FIG. 7 shows a perspective view of the design of the flow rate regulator shown in FIGS. 6 and 6A-C;

FIG. 8 shows a perspective, simplified exploded view of the design of the flow rate regulator shown in FIGS. 6, 6A-C and 7, wherein a pair of segments comprises tiered segments that have a material recess on their lower side;

FIG. 9 shows a perspective representation of the control element of the flow rate regulator from the preceding FIGS. 6, 6A-C, 7 and 8 comprising two pairs of segments each consisting of identically shaped segments, wherein the segments of one pair of the two pairs of segments have a material recess;

FIG. 10 shows a top view of the control element of the flow rate regulator from the preceding FIGS. 6, 6A-C, 7, 8 and 9;

FIG. 10A shows a sectional view of the control element from FIG. 10, wherein the control element il0 cut-out along the line marked with the letter A in FIG. 5;

FIG. 10B shows a sectional view of the control element from FIG. 10, wherein the control element is cut-out along the line marked with the letter B in FIG. 10;

DETAILED DESCRIPTION

Figure 11:
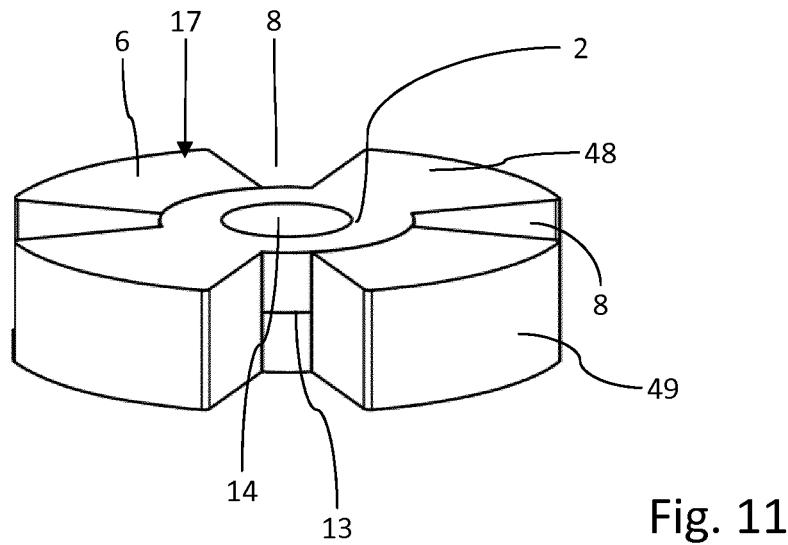
FIG. 11 shows another possible embodiment of a control element that comprises at least two parts, wherein the segments of the control element are comprise an upper part and a lower part.

FIGS. 1 to 3 show a first, and FIGS. 6 to 8 a second, exemplary embodiment of a flow rate regulator, indicated in its entirety as 1, for adjusting the flow rate of a fluid, in particular a liquid and/or gaseous medium, such as water.

The flow rate regulators 1 each have a control element 2 that is arranged inside a housing 4 of the flow rate regulator 1. A clear opening dimension 5 of a control opening 3 of the flow rate regulator 1 is modified by the control element 2 as a function of pressure generated by the fluid and acting on the control element 2. In particular, it may be provided that control opening 3 is not completely closed, preferably not completely closed even if the maximum pressure of functional range has been reached.

The control element 2 of the two versions of the flow rate regulator 1 is shown in FIGS. 4 and 5 as well as 9 and 10 without the housing 4 of the flow rate regulator 1.

Figure 12:
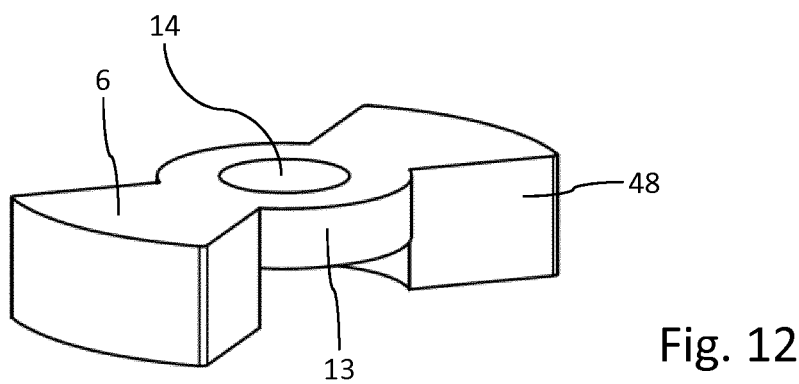
FIG. 12 shows the upper part of the control element from FIG. 11.
Figure 13:
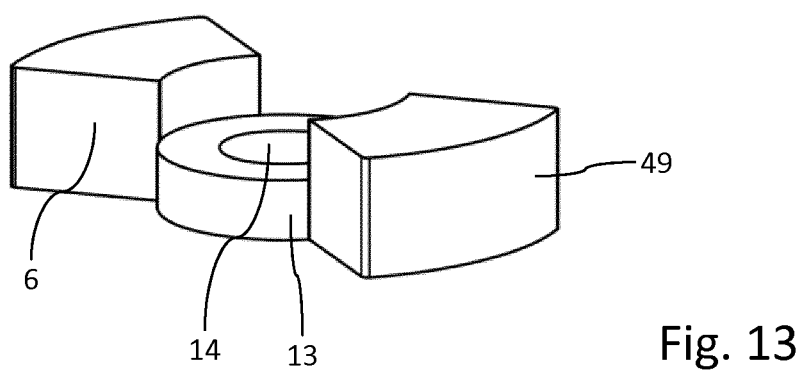
FIG. 13 shows the lower part of the control element from FIG. 11.

FIGS. 11 to 13 show another possible embodiment of a control element 2 comprising an upper part 48 and a lower part 49. This makes it easy to achieve different deformation resistances for the respective segments 6. The upper part 48 and the lower part 49 will preferably have the same shape so that only one tool is required for production which considerably reduces costs.

As shown in the examples, the control element 2 may be disc-shaped.

The control opening 3 and/or its clear opening dimension 5 may thus relate to the narrowest point in a flow path 46 formed by the housing 4 and the control element 2. The edge 7 of the control opening 3 is therefore formed by the interaction of the housing 4 and the control element 3 dependent upon pressure. Due to the pressure-dependent deformation of the control opening 3, it may also be composed of several individual control opening parts, wherein the control opening parts may be separated from each other, for example, by contact between the control element 2 and part of the housing 4. In such cases, the edges of the individual control opening parts are thus likewise formed by the housing 4 and the control element 2. The entirety of the control opening parts may then create the control opening 3.

The control element 2 has at least two detached segments 6, each of which can be deformed dependent upon pressure. Together with the housing 4, the segments 6 form an edge 7 which limits the control opening 3. Thus, the clear opening dimension 5 of the control opening 3 can be defined by the pressure-dependent deformation and/or a change in position of the control element 2 within the housing 4 dependent upon the prevailing pressure.

The control element 2 has notches 8 between two adjacent segments 6 in order to be able to deform the segments 6 of the control element 2 independently of each other dependent upon pressure in each case. The notches 8 thus detach the individual segments 6.

The control elements 2 of flow rate regulators 1 each have four segments 6 in the embodiments shown in the Figures. In this context, two opposing segments 6 each form a pair of segments. The two segments 6 of a pair of segments can preferably be of identical design. Alternatively or additionally, the individual segments 6 of different pairs of segments may be differently shaped (see the different shapes shown in FIGS. 4 and 9 to be described in more detail below).

FIGS. 11 to 13 show a control element 2 the segments 6 of which comprise an upper part 48 and a lower part 49. In the assembly position, the upper part 48 and the lower part 49 are aligned relative to each other in such a way that the segments 6 of the upper part are aligned transversely or perpendicularly to the segments 6 of the lower part 49.

The housing 4 forms a receiving chamber 9 in which a fastener 10 is arranged. The control element 2 is mounted and/or held in the housing 4 by means of the fastener 10 which is designed in this case as a pin 16 projecting, preferably vertically, from a receiving chamber floor 15.

Preferably, the control element 2 is mounted within the housing 4 so that it can move relative to the housing 4 by means of the fastener 10. It may be provided that the control element 2 is adjustably mounted and/or deformable at least parallel to a longitudinal axis 11 of the flow rate regulator 1 and/or to a flow direction 12 of a fluid flowing through the flow rate regulator in the operational state. The fastener 10 may have an enlargement 47 at its free end. In this way it is easier to avoid having the control element 2 completely detach from the fastener 10.

The control element 2 has a connector 13 to which the individual segments 6 of the control element 2 are connected. Preferably, the control element 2 is designed integrally and/or monolithically, for example made of an elastic material such as rubber. The control element 2 thus develops a pressure-dependent return force, or a pressure-dependent resistance, against the aforementioned pressure-dependent deformation. Equilibrium is thus created depending on the pressure difference across the flow rate regulator 1 with a specific deformation of the control element 2 which is associated with a specific opening dimension 5. Above a pressure threshold value that characterizes the working range, this will become smaller as pressure rises such that a constant flow rate per time unit continues to flow despite the increase in pressure. The flow rate regulator 1 thus regulates a constant flow rate per time unit within the working range dependent upon pressure. A plurality of detached segments 6 are provided according to the current invention. They may each have their own control curve. The overall control behavior of the flow rate regulator results from the sum of these control curves.

The control element 2 is fitted to the fastener 10 via the connector 13, which has a continuous insertion opening 14. The enlargement 47 of the fastener 10 has a wider cross-sectional diameter than the diameter of the insertion opening 14 in order to better prevent the control element 2 from falling off the fastener 10.

At least two segments 6 of the flow rate regulator 1 have different resistances against pressure-dependent deformation by the fluid It is thus possible for the two segments 6, each with different resistances, are then intended for setting flow rates in different pressure ranges. For example, segments 6, which have at least two different resistances, can be set so that one of the segments 6 controls a low pressure range and the other of the two segments 6 controls a high pressure range. It can be particularly useful if a pair of segments 6 is set to control a specific pressure range.

In order to ensure that at least two segments 6 have different resistances to pressure-dependent deformation, the at least two segments 6 may differ, for example, in their material thickness and/or in their stiffness and/or in their shape and/or in the size of a contact surface 17 and/or in their material.

Examples are shown in FIGS. 4, 5 and 9 and 10. The control element 2 shown in FIGS. 5 to 5B has two pairs of segments with two segments 6 each. As shown here, segments 6 can, for example, be wing-shaped and/or in the form of a circular segment. It may also be provided that segments 6 may be positioned with respect to each other at a certain angle when rotating around a central axis of the control element 2. This may be achieved, for example, by arranging the segments 6 at equal distances from one another, especially in the direction of rotation.

The control element 2 from FIGS. 4 and 5 has a tier 35 on two of its segments 6, resulting in a material recess 38, i.e. a material weakening, at the distal end of the two segments 6. The other pair of segments has segments 6 without recesses.

Further options for creating different deformation resistances are shown in FIGS. 9 and 10. The control element 2 has 38 material recesses 38 on a pair of segments 6, each with material recesses on the bottom 37. The material recesses 38 may preferably be formed in a distal area of the respective segment 6. In this context, the term "distal" may refer to an area removed from a central axis of the control element 2, whereby "proximal" defines an area closer to the central axis.

The segments 6 with such a material recess 38 have lower resistance than the segments 6 without material recesses by virtue of the material recesses 38. As a result, they close at lower pressures thus permitting a lower flow rate per time unit.

Furthermore, as can be seen in particular in FIG. 1, a control element may have 2 segments 6 with different lengths, in particular in relation to a length measured from a central axis. Accordingly, this embodiment likewise permits the creation of different resistances for the segments 6.

Alternatively additionally, differing resistance to pressure-dependent deformation of segments 6 may also be realized by using an upper part 48 and a lower part 49, as for example in the alternative shown in FIGS. 11 to 13. The segments 6 of the upper part 48 may be deformed less heavily and/or quickly upon the application of pressure as the segments 6 on the lower part 49. The upper part 48 is thus at least partially pressed against the lower part 49 when pressure is applied to the control body 2; for this reason the segments 6 of the upper part 48 have greater deformation resistance than the segments 6 of the lower part 49 given that they contact the lower part 49. By contrast, the lower part 49 is pushed away from the upper part 48. In particular such that a gap is formed between upper part 48 and lower part 49 in an area in which the segments 6 of the lower part are in contact with the upper part 48, especially in a neutral position.

The housing 4 has at least one outlet opening 18. The embodiments depicted in the figures have several outlet openings 18. The edges 19 of the outlet openings 18 of the housing 4 form a partial section of the edge 7 which defines the control opening 3. The outlet openings 18 are located downstream of the control element 2 and the control opening 3 in the flow direction 12.

The clear opening dimension 5 of the control opening 3 is thus defined by the pressure-dependent interaction of the control element 2 with the housing 4.

The outlet openings 18 of the housing are designed as an annular gap 20 or as a plurality of interrupted gap sections 21 arranged in annular fashion. The gap 20 or the gap sections 21 are arranged around the fastener 10 arranged centrally in the housing 4.

The housing 4 has several segment chambers 23, which are separated from each other by means of partitions 22, preferably aligned parallel to the direction of flow 12. The two flow rate regulators 1 of FIGS. 1-3 and FIGS. 6-8 differ in the height of their partitions 22.

In the first embodiment, the partitions 22 protrude above the height of the control element 2 inserted into the housing 4. In the second embodiment, the height of the partitions 22 is significantly lower, so that the control element 2 projects above the height of the partitions 22 when inserted.

As may be seen from FIGS. 2, 3, 7 and 8, the receiving chamber 9 can thus be divided by the partition walls 22 into a number of segment chambers 23 corresponding, for example, to the number of segments 6 of the control element 2. In the present case, the housings 4 of the flow rate regulators 1 shown here therefore have four segment chambers 23 each. Each segment chamber 23 contains one segment 6, for example exactly one segment 6. Disruptive influences from deflected fluid flows between individual segment chambers 23 can be better avoided by means of the partitions 22.

The partitions 22 may be extended in such a way that they divide the outlet opening 18 of the housing 4 into at least two, preferably four, separate outlet opening sections 24. The outlet opening sections 24 can be designed as separate channels. Each segment chamber 23 can be assigned a drain opening section 24.

In order to achieve even better pressure-dependent control of the flow rate, the flow rate regulator 1 may have at least one spacer 25 in at least one of its segment chambers 23, which can be acted upon in a pressure-dependent manner by the at least one segment 6 arranged in this segment chamber 23 concerned. The spacer 25 can be arranged offset in a radial direction to the outlet opening 18 or an outlet opening section 24, in particular offset to the outside. The spacer 25 can be used to define the spacing 26 between the segment 6 contacting the spacer 25 dependent upon pressure and an impact surface in segment chamber 23 formed by the housing. The spacer 25 can therefore be used to prevent contact along the entire surface and/or in its entirety of a distal area of a segment 6 on the impact surface. The clear opening dimension 5 of the control opening 3 may thus be set to a minimum, so as to prevent the complete closure of the outlet opening 18 and/or the outlet opening sections 24 and/or the control opening 3 formed by the interaction of control element 2 and housing 4.

The flow rate regulator 1 may have at least one contact body 28 in at least one of its segment chambers 23 in order to be able to modify the control behavior of the flow rate regulator 1 even more precisely. In this context, the contact body 28 may be impinged by a segment 6 of the control element 2 and/or reset against it.

Two contact bodies are arranged in each segment chamber in the embodiments shown in the figures. The contact bodies 28 may be arranged in such a way that they may each be acted upon from a lateral edge section of a segment dependent upon pressure. Preferably, a pressure-dependent seal can be created between the areas on contact on the bottom 37 of segment 6 and a contact surface 29 of the contact body 28.

Furthermore, it may be provided that individual spacers 25, as can be seen for example in FIG. 6, are designed with different widths. In the alternate embodiment of the flow rate regulator 1 shown in FIG. 6, it has at least four spacers 25, wherein each of two spacers 25 are located opposite each other in the receiving chamber 9. Opposing spacers 25 may be of identical design and/or adjacent spacers can be of different designs.

The contact bodies 28 may have a contact surface 29 that is oriented obliquely relative to the longitudinal axis 11 and/or radial direction 41 and which can be acted upon by segment 6 arranged in the respective segment chamber 23. Contact along the entire surface of the contact surface 29 of the contact body is possible as a result of the oblique design of the contact surface 29 even in the case of deformation, in particular flexing in the direction of flow 12, of segment 6.

The outlet opening section 24 of at least one segment chamber 23 can be divided by the contact body 28 into two separate partial openings 30. In the embodiment shown in the figures that include two contact bodies 28 per segment chamber 23, the contact bodies 28 divide the outlet opening cross-section 24 of a segment chamber 23 into a total of three partial openings 30, wherein the central partial opening 30 is the largest and/or the two partial openings 30 flanking the central partial opening 30 are smaller than the central partial opening and/or the flanking partial openings 30 are of the same size.

The segment chambers 23 each have an impact surface 27 arranged diagonally or vertically to the longitudinal axis 11 of the flow rate regulator 1. The impact surfaces 27 of at least two segment chambers 23 may be arranged offset relative to each other in the longitudinal direction in order to improve the ability to adjust different control behaviors of the individual segments 6 in the segment chambers. This allows a tier to be formed between the impact surfaces 27 of the segment chambers 23.

The flow rate regulator 1 has a plurality of support elements 31 that, for example, are arranged at equal distances from each other in the circumferential direction in order to provide improved avoidance of slippage of the control element even in higher pressure ranges. As shown in FIGS. 2 and 7, the support elements 32 may be formed by a partition 22 and/or be arranged on a partition 22.

The support elements 31 may thus form a groove 32 into which the control element 2 may be inserted, preferably between a partition 22 and the fastener 10. The support elements 31 can protrude vertically relative to the receiving chamber floor 15 and/or against the flow direction 12. As can be seen in FIGS. 1, 2, 6 and 7, the support elements 31 may be located in the notches 8 of the control element 2 between two segments 6. On the one hand, this allows a very compact design for the flow rate regulator 1 and, in addition, enables the very stable positioning of the control element 2.

Alternatively or additionally, it may be provided that the partitions 22 in the notches 8 of the control element 2 are each located between two segments 6. The housing 4 has a circumferential wall 33, which limits and encloses the receiving chamber 9 and thus also the segment chambers 23 towards the outside in a radial direction. Preferably, the wall 33 forms a cylinder shell, in particular without openings.

A further option for adjusting the control behavior of the flow rate regulator 1 is possible by forming or placing a spacing element 34 on the floor of the receiving chamber 15 and/or on a spacer top 42 and/or on a contact body top 43. An example of this is shown in particular in FIG. 1A, wherein a spacing element 34 is arranged on the upper side 42 of a spacer 25. A further spacing element 34 is arranged on the floor of the receiving chamber 15. The spacing elements 34 can be used to prevent the control element 2 from resting flat against the respective surface and/or to define a distance between the surface and the control element 2 so that the clear opening dimension 5 of the control opening 3 can be limited to a minimum, i.e. in particular it is not possible to completely close the outlet opening 18 and/or the outlet opening sections 24. The spacing elements 34 can also be used to influence the deformability of control element 2 in order to achieve a specific pressure behavior.

For example, a spacing element 34 may comprise at least one pin 44 and/or at least one ridge.

The flow rate regulator 1 may be manufactured in a particular cost-effective manner if the housing 4 is of an integrated and/or monolithic design. In particular, the partitions 22 and/or the fasteners 10 and/or the spacers 25 and/or the contact bodies 28 and/or the support elements 31 may be formed by the housing 4.

The control element 2 is thus arranged in a flow path 46 of the flow rate regulator 1 between an inlet 39 and an outlet 40 of the flow rate regulator 1.

Accordingly, the invention relates to a flow rate regulator 1 for limiting a flow rate of a fluid, wherein a clear opening dimension 5, which can be modified between a maximum and a minimum, of a control opening 3, may be defined by means of an interaction between a control element 2 and a housing 4 of the flow rate regulator 1, wherein the clear opening dimension 5 of the control opening 3 can be modified by a deformation of the control element 2 as a function of a pressure acting on the control element 2, wherein the control element 2 has at least two segments 6 which are detached from one another and can each be deformed as a function of pressure, and wherein an edge 7 defining the control opening 3 is formed by the control element 2 and the housing 4. In this case, a minimum clear opening dimension 5 may mean that the complete closure of the control opening 3 is not provided for.

REFERENCE NUMERAL LIST

1 Flow rate regulator
2 Control element
3 Control opening
4 Housing
5 Clear opening dimension
6 Segment
7 Edge of the control opening
8 Notch
9 Receiving chamber
10 Fastener
11 Longitudinal axis
12 Flow direction
13 Connector
14 Insertion opening
15 Receiving chamber floor
16 Pin
17 Contact surface
18 Outlet opening
19 Edge of the outlet opening
20 Gap
21 Gap section
22 Partition
23 Segment chamber
24 Outlet opening section
25 Spacer
26 Spacing
27 Impact surface
28 Contact body
29 Contact surface
30 Partial opening
31 Support element
32 Groove
33 Housing wall
34 Spacing element
35 Tiers
36 Outlet side
37 Bottom side
38 Material recess
39 Inlet
40 Outlet
41 Radial direction
42 Spacer top
43 Contact body top side
44 Pins
45 Ridge
46 Flow path
47 Enlargement
48 Upper part
49 Lower part

The invention claimed is:

1. A flow rate regulator (1) for adjusting a flow rate of a fluid, the flow rate regulator (1) comprising:
   a control element (2);
   a control opening (3) formed at least partially by a housing (4), a clear opening dimension (5) of the control opening (3) is modifiable by the control element (2) as a function of pressure acting on the control element (2);
   the control element (2) forms at least a partial section of an edge (7) defining the control opening (3); and
   the control element (2) has at least two segments (6) which are detached from each other and are each deformable as a function of pressure, wherein the at least two segments differ in at least one of: a material thickness thereof; a stiffness thereof or a material thereof.

2. The flow rate regulator (1) as claimed in claim 1, wherein at least one of the at least two segments (6) are detachable via a notch (8) formed therebetween or the control element (2) is disc-shaped.

3. A flow rate regulator (1) for adjusting a flow rate of a fluid, the flow rate regulator (1) comprising:
   a control element (2);
   a control opening (3) formed at least partially by a housing (4), a clear opening dimension (5) of the control opening (3) is modifiable by the control element (2) as a function of pressure acting on the control element (2);
   the control element (2) forms at least a partial section of an edge (7) defining the control opening (3);
   the control element (2) has at least two segments (6) which are detached from each other and are each deformable as a function of pressure; and
   a fastener (10) arranged in a receiving chamber (9), the control element (2) is at least one of mounted or held in the housing (4) by the fastener (10),
   the control element (2) is deformably arranged on the housing (4), at least one of parallel to a longitudinal axis (11) of the flow rate regulator (1) or to a flow direction (12) of a fluid flowing through the flow rate regulator (1) in an operational state, and
   the control element (2) has a connector (13), and at least one of the individual segments (6) are connected to the connector or the control element (2) is mounted in the housing (4) via the connector, and
   the connector (13) has an insertion opening (14), into which the fastener (10) is inserted.

4. The flow rate regulator (1) as claimed in claim 1, wherein the at least two segments (6) have different resistances to pressure-dependent deformation such that the at least two segments (6) are set to adjust a flow rate in different pressure ranges.

5. The flow rate regulator (1) as claimed in claim 1, wherein an edge (19) of at least one outlet opening (18) of the housing (4) forms a partial section of the edge (7) defining the control opening (3), and the outlet opening (18) is arranged downstream of the control element (2) in a flow direction (12).

6. A flow rate regulator (1) for adjusting a flow rate of a fluid, the flow rate regulator (1) comprising:
a control element (2);
a control opening (3) formed at least partially by a housing (4), a clear opening dimension (5) of the control opening (3) is modifiable by the control element (2) as a function of pressure acting on the control element (2);
the control element (2) forms at least a partial section of an edge (7) defining the control opening (3); and
the control element (2) has at least two segments (6) which are detached from each other and are each deformable as a function of pressure,
wherein the outlet opening (18) of the housing (4) includes a gap (20), comprising at least one of a circumferential or annular gap in one circumferential direction, or a plurality of interrupted gap sections (21),
the gap (20) or the gap sections (21) extend around a fastener (10) arranged centrally in the housing (4).

7. The flow rate regulator (1) as claimed in claim 1, wherein a partition (22) is located between the two segments (6).

8. The flow rate regulator (1) as claimed in claim 1, further comprising at least two partitions (22) which divide a receiving chamber (9), which is arranged in a direction of flow (12) in front of an outlet opening (18) of the housing (4) and in which the control element (2) is arranged within the housing (4), into at least two segment chambers (23) separated from one another, in which segment chambers (23) at least one said segment (6) is arranged in each case, and the partitions (22) divide the outlet opening (18) of the housing (4) into at least two outlet opening sections (24) separated from one another.

9. The flow rate regulator (1) as claimed in claim 8, further comprising at least one spacer (25) arranged in at least one said segment chamber (23), the spacer (25) is impinged upon by the at least one segment (6) arranged in the segment chamber (23) dependent upon pressure, and
a spacing (26) is defined by the spacer (25) between the segment (6) impinging the spacer (25) and an impact surface (27) of the segment chamber (23) in an operational position.

10. The flow rate regulator (1) as claimed in claim 9, further comprising at least one contact body (28) arranged in at least one of the segment chambers (23) that has a contact surface (29) oriented obliquely relative to at least one of a longitudinal axis (11) or a radial direction (41), and wherein the contact surface (29) is contacted by one said segment (6) arranged in the segment chamber (23) upon the segment (6) being deformed in a pressure-dependent manner, and
a seal is created between the segment (6) and the contact body (28) when the segment (6) contacts the contact surface (29).

11. The flow rate regulator (1) as claimed in claim 10, wherein an outlet opening section (24) of at least one segment chamber (23) is divided into two separate partial openings (30) by the contact body (28).

12. The flow rate regulator (1) as claimed in claim 1, wherein the at least two segments (6) comprises at least four of the segments (6) which are detached from one another and are each deformable as a function of pressure.

13. The flow rate regulator (1) as claimed in claim 8, wherein the segment chambers (23) each have an impact surface (27) arranged at least one of obliquely or perpendicularly to a longitudinal axis (11) of the flow rate regulator (1), and
the impact surfaces (27) of the at least two segment chambers (23) are arranged at least one of offset or tiered relative to one another in a longitudinal direction.

14. The flow rate regulator (1) as claimed in claim 1, further comprising a plurality of support elements (31), projecting from a receiving chamber floor, each support element forming a groove (32), the grooves (32) are open opposite to a flow direction (12),
and at least one of the control element (2) is inserted into the grooves (32) or the support elements (31) are arranged in a section (8) of the control element (2) between two of the segments (6).

15. The flow rate regulator (1) as claimed in claim 1, wherein the at least two segments (6) are integrally connected.

16. The flow rate regulator (1) as claimed in claim 8, wherein the housing (4) has a circumferential wall (33), which limits at least one of the receiving chamber (9) or the segment chambers (23) outwards in a radial direction (41).

17. The flow rate regulator (1) as claimed in claim 8, further comprising a spacing element (34) is formed or placed on at least one of a receiving chamber floor (15), a spacer top side (42), or on a contact body top side (43), and the spacing element (34) is formed as at least one of a pin (44) or as at least one ridge (45).

18. The flow rate regulator (1) as claimed in claim 1, wherein the control element (2) is made of at least one of an elastic or compressible material.

19. The flow rate regulator (1) as claimed in claim 1, wherein at least one of the segments (6) has a tiered surface (35).

20. The flow rate regulator (1) as claimed in claim 1, wherein at least one of the segments (6) has a material recess (38), and the material recess (38) is arranged on a bottom side (37) facing an outlet side (36) of the flow rate regulator (1).

21. The flow rate regulator (1) as claimed in claim 1, wherein the housing (4) is formed at least one of integrally or monolithically, and at least one of partitions (22), fasteners (10), spacers (25), contact bodies (28), or support elements (31) are arranged to pass through the housing (4).

22. The flow rate regulator (1) as claimed in claim 1, wherein the control element (2) is arranged in a flow path (46) between an inlet (39) and an outlet (40) of the flow rate regulator (1).

23. The flow rate regulator (1) as claimed in claim 1, wherein the segments (6) of the control element (2) comprise an upper part (48) and a lower part (49).

24. The flow rate regulator (1) as claimed in claim 1, wherein the control element (2) comprises an upper part (48) and a lower part (49), and the upper part (48) and the lower part (49) are identical.

* * * * *